United States Patent
Sassone et al.

(10) Patent No.: US 10,823,617 B2
(45) Date of Patent: Nov. 3, 2020

(54) METHOD AND SYSTEM FOR DETECTING POLARIZED LIGHT EMITTED BY ELECTRONIC DISPLAYS

(71) Applicant: Datalogic IP Tech S.r.l., Lippo di Calderara di Reno (Bologna) (IT)

(72) Inventors: Adriano Sassone, Bologna (IT); Gabriele Tinti, Bologna (IT); Kurt Vonmetz, Bologna (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 51 days.

(21) Appl. No.: 16/122,802

(22) Filed: Sep. 5, 2018

(65) Prior Publication Data

US 2020/0072673 A1 Mar. 5, 2020

(51) Int. Cl.
*G01J 4/04* (2006.01)
(52) U.S. Cl.
CPC ...................................... *G01J 4/04* (2013.01)
(58) Field of Classification Search
CPC ...................................................... G06K 7/01
See application file for complete search history.

(56) References Cited

U.S. PATENT DOCUMENTS

| 6,392,593 | B1* | 5/2002 | Pemble | G01S 19/28 342/357.67 |
| 8,238,026 | B1* | 8/2012 | Kemme | G01J 4/04 250/225 |
| 8,729,502 | B1* | 5/2014 | Klotzkin | G01N 21/6428 250/458.1 |
| 8,881,983 | B2 | 11/2014 | Havens et al. | |
| 9,168,774 | B2 | 10/2015 | Lass, Jr. et al. | |
| 2013/0070140 | A1 | 3/2013 | Gove et al. | |

* cited by examiner

*Primary Examiner* — Tony Ko
(74) *Attorney, Agent, or Firm* — Stoel Rives LLP

(57) ABSTRACT

The disclosure relates to a light sensor system for determining the proximity of electronic devices by analyzing the polarization of detected light. The light sensor system includes a plurality of light sensors each including polarizers, such as linear plane polarizers and/or circular polarizers. The filtered light sensors are each operable to detect light passing through the respective polarizers. The light sensor system further includes an unfiltered light sensor operable to detect the presence of light. The light sensor system includes a processor in operable communication with each of the light sensors, the processor operable to determine whether the detected light is polarized or non-polarized based on the accumulated data of the various polarized light sensors and unfiltered light sensor.

19 Claims, 3 Drawing Sheets

METHOD AND SYSTEM FOR DETECTING POLARIZED LIGHT EMITTED BY ELECTRONIC DISPLAYS

BACKGROUND

The field of the present disclosure relates generally to optical reading devices, and in particular, to such devices and associated methods relating to detecting polarized light emitted by electronic displays.

Over the last few decades, our society has become more dependent on being connected to the world of digital information via smartphones and other mobile devices. Although many people primarily use mobile devices to communicate with other people, such as via texts, emails, or phone calls, or to consume online content, mobile devices are also being increasingly used to communicate with other electronic devices, such as via wireless technology or by using image recognition software to obtain data directly from a display of the electronic device, such as QR codes or barcodes. For such communications to function properly, the mobile devices must typically be within a particular proximity range of one another. In some instances, such as when the devices communication via wireless technologies, the proximity range between the devices may be rather large. However, for other instances, such as for using the mobile device to gather data from another display, the devices may need to be sufficiently close to one another to properly become paired.

For the latter instance, the present inventors have developed an improved system and method for detecting the proximity of a mobile device with a target electronic device based on an evaluation of the light emitted from the target electronic device. The present inventors have determined that it would be desirable to develop a system to allow a mobile device to identify the presence of a display screen and to adjust an illumination system to facilitate obtaining barcodes or other optical code data from the display screen via the mobile device. The present inventors have also determined that it would be desirable to develop a system and method that may alter the functionality of the mobile device, such as by activating a specialized communication protocol, when the mobile device and the target electronic device are paired or by changing specific configurations of the target electronic device when the mobile device is near the target electronic device. Additional aspects and advantages of such data reading systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
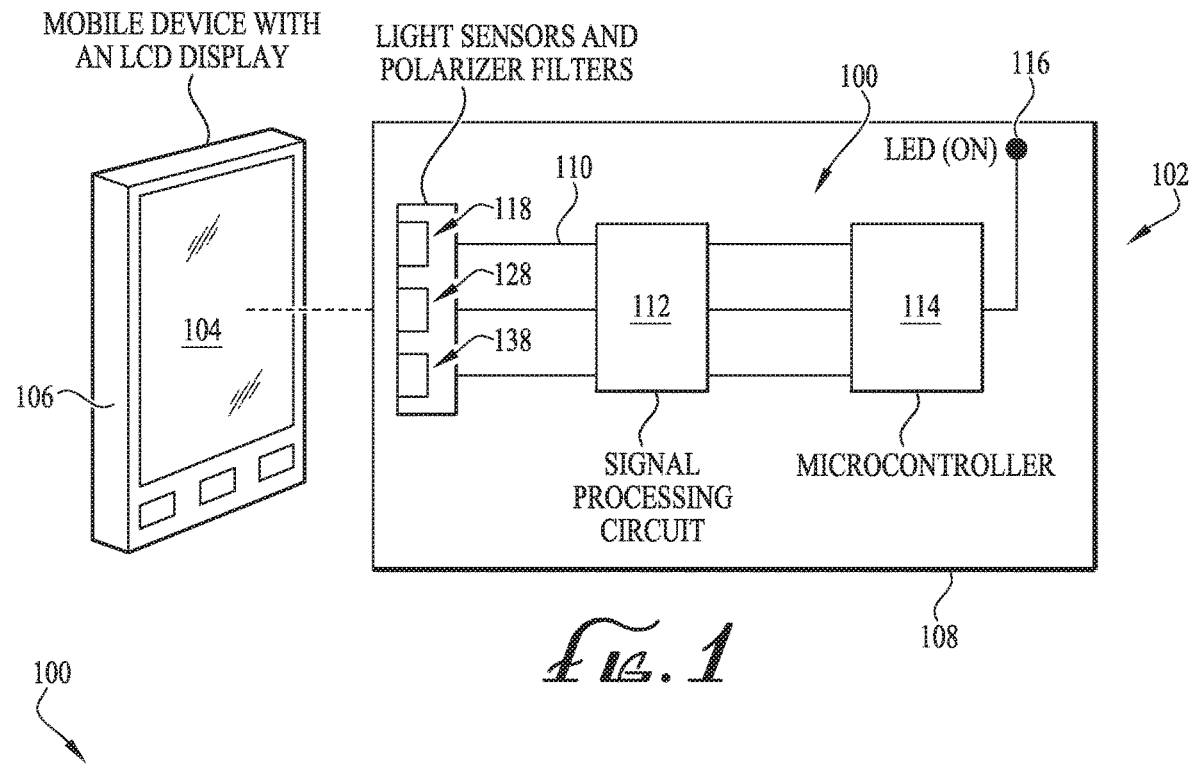
FIG. 1 is a schematic view illustrating components of a polarized light sensor system in conjunction with a mobile device to detect the proximity of an electronic display in accordance with one embodiment.

FIG. 1 illustrates one embodiment of a mobile device 102 using polarization sensing technology to detect the proximity of a display 104 of an electronic device 106. With general reference to FIG. 1, the following disclosure relates generally to an improved polarized light sensor system 100 capable of detecting the presence of the electronic display 104 via polarization sensing technology. Typically, ambient light or light reflecting from a substrate or item that is not backlit is scattered and generally randomly polarized. However, light emitted from a backlit screen, such as an electronic display 104 of the electronic device 106, will be linearly or circularly polarized. Accordingly, polarization sensors may be used to determine whether the mobile device 102 is near an electronic display 104 by analyzing the polarization of the light emitted by the electronic device 106.

In some embodiments, the polarization sensing technology may be used to tailor operation of the mobile device 102 carrying the sensor system 100 with the electronic device 106, such as to activate a specialized operation mode of the mobile device 102 to facilitate communicate with the electronic device 106). Alternatively, polarization sensing technology may be used to control the operation of an illumination system to facilitate data reading from the electronic display 104 via the mobile device 102, such as for reading decodable indicia from an electronic device with a backlit screen. In such embodiments, the mobile device 102 may adjust the illumination system (e.g., turn on or off the system as needed) to ensure that the mobile device 102 can accurately obtain the decodable indicia from the electronic display 104. In still other embodiments, the polarization sensing technology may be used for other suitable purposes in other embodiments. Additional details of these and other embodiments are provided further below with reference to the figures.

Figure 2:
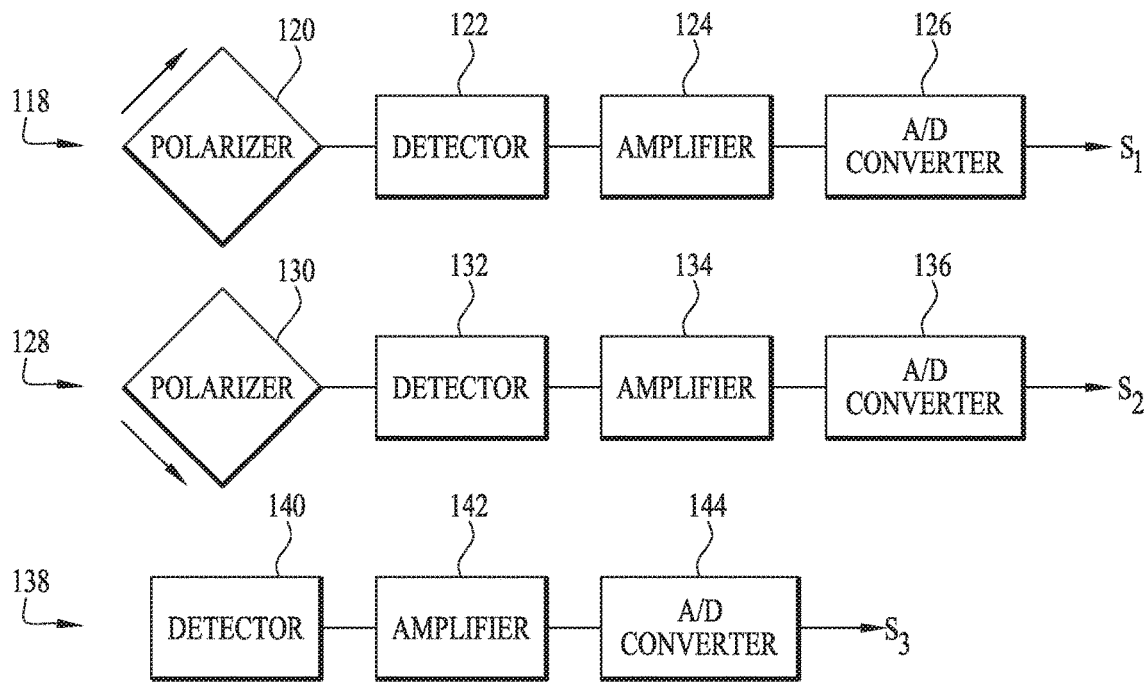
FIG. 2 is a schematic illustration of one embodiment of polarization light sensors in accordance with one embodiment.

FIG. 2 is a schematic illustration of one embodiment of polarization light sensors in accordance with one embodiment. With collective reference to FIGS. 1 and 2, the mobile device 102 includes a housing 108 that houses the polarized light sensor system 100. As noted previously, the polarized light sensor system 100 may be operable for detecting illumination and determining the polarization of the detected illumination to determine whether the illumination is originating from a backlit screen, such as an electronic display 104 of an electronic device 106.

With particular reference to FIG. 1, the polarized light sensor system 100 includes a plurality of light sensors 118, 128, 138 operable to detect light, where the light sensors 118, 128, 138 are coupled via a system bus architecture 110 to a signal conditioning circuit 112 and a microcontroller 114. When light is detected, the signal conditioning circuit 112 and the microcontroller 114 together evaluate the measured light and assess whether the light is polarized (and may also determine the angle or rotation of the polarized light) as further described in detail below. In other embodiments, an evaluation circuit (not shown) may be used in place of the microcontroller 114 to evaluate the measured light and assess whether the light is polarized or non-polarized. If the light is determined to be polarized, an LED 116 in communication with the microcontroller 114 may be turned on to indicate that polarized light has been sensed and that an electronic display 104 is nearby. If the light is not polarized, then the LED 116 may remain in the off position. With particular reference to FIG. 2, the following provides additional detail relating to example embodiments of the polarized light sensor system 100.

With reference to FIG. 2, in one embodiment, the polarized light sensor system 100 includes a first light sensor 118, a second light sensor 128, and a third light sensor 138. The first light sensor 118 includes a first linear polarizer 120 and a first light detector 122 (such as a phototransistor or photodiode) located behind the first linear polarizer 120. Generally speaking, the linear polarizer 120 is a device which selectively allows the passage of certain orientations of linear polarized light. In other words, the linear polarizer converts light of an undefined or mixed polarization into light of a well-defined polarization, that is, polarized light.

When light is absorbed by the first light detector 122, that absorbed light is converted into a current. The first light detector 122 may be operably connected to a transimpedance amplifier 124 that converts current to voltage, and the voltage output may be directed to an analog-to-digital (A/D) converter 126 operable for producing a first signal $S_1$. The second light sensor 128 may be arranged in a similar fashion. In other words, the second light sensor 128 includes a second linear polarizer 130 and a second light detector 132 located behind the second linear polarizer 130. The second light detector 132 may be operably connected to a transimpedance amplifier 134 that converts current to voltage, and the voltage output may be directed to an analog-to-digital (A/D) converter 136 operable for producing a second signal $S_2$.

Unlike the first two sensors 118, 128, the third light sensor 138 does not include a polarizer. Rather, the third light sensor 138 remains unfiltered. Accordingly, the third light sensor 138 includes a third light detector 140 operably connected to a transimpedance amplifier 142 that converts current to voltage, and the voltage output may be directed to an analog to digital (A/D) converter 144 operable for producing a third signal $S_3$.

In this arrangement, the polarized light sensor system 100 with the first and second light sensors 118, 128 having polarizing linear filters 120, 130, and the third light sensor 138 having no filter, is used to analyze the light detected by the sensors 118, 128, 138 and determine whether the detected light is non-polarized light (e.g., ambient or natural light) or polarized light (e.g., light emitted from a display 104 of an electronic device 106). Since the orientation of the polarization of the light being detected is initially unknown, the first and second polarizers 120, 130 of the first and second sensors 118, 128 may be disposed at a determined angular configuration relative to each other. By rotating the polarizers 120, 130, the output values of the signals $S_1$ and $S_2$, along with the output value of the signal $S_3$ from the non-polarized light sensor 138 may be analyzed, such as via the signal conditioning circuit 112, microcontroller 114, and/or another evaluation unit (not shown) to distinguish polarized light from non-polarized light and also to determine the polarization angle of the detected light. Additional details relating to the processing of signals $S_1$, $S_2$, and $S_3$ to evaluate whether light is polarized and to determine polarization angle are provided below.

In some embodiments, the polarized light sensor system 100 may include fewer converters such that the sensors 118, 128, 138 may each be in communication with a common converter. For example, the polarized light sensor system 100 may include a single converter in operable communication with the amplifiers 124, 132, 142 (or with the light detectors 122, 132, 140), where the single converter is operable to receive the first, second, and third currents from each of the amplifiers 124, 132, 142 (or from each of the light detectors 122, 132, 140) and produce the signals $S_1$, $S_2$ and $S_3$. In other embodiments, the polarized light sensor system 100 may include two converters, where the two polarized light sensors 118, 128 may each be in communication with a common converter, and the unfiltered light sensor 138 may be in operable communication with a second converter. It should be understood that other configurations are possible without departing from the principles of the disclosure.

Figure 3:
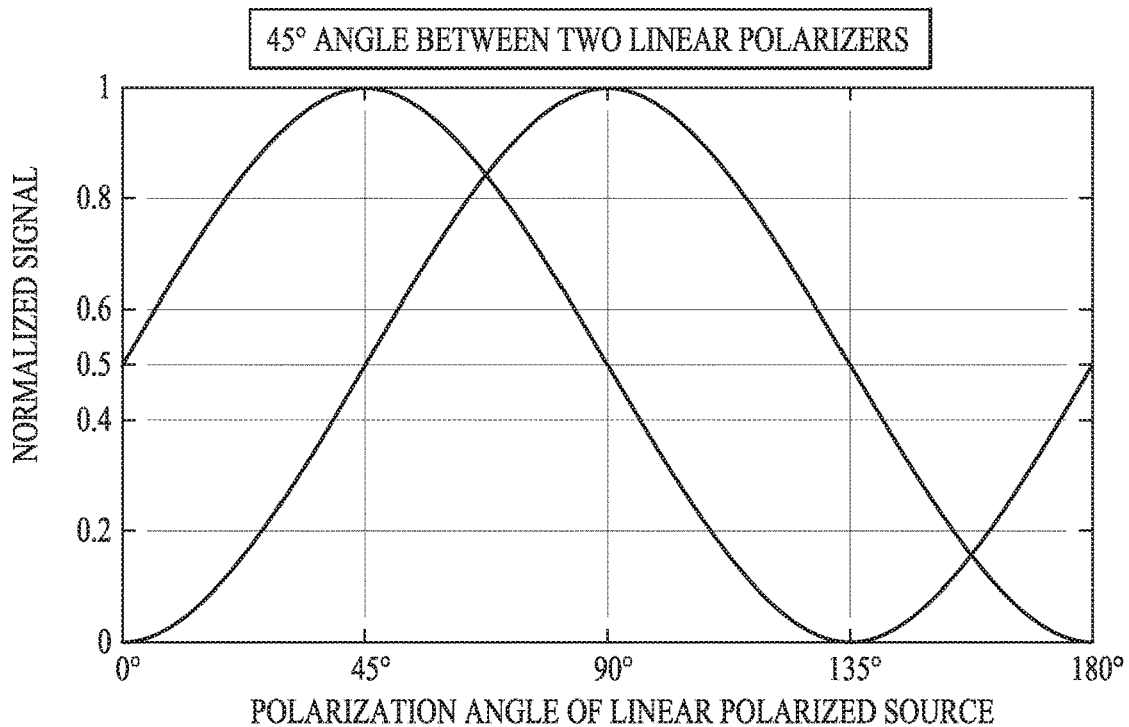
FIGS. 3 and 4 are graphs illustrating light intensity values for different light linear polarization angles of the polarized light sensor system.

FIG. 3 illustrates a graph showing expected light intensity values for the filtered sensors 118, 128 as compared to the light intensity values detected by the unfiltered sensor 138. It should be understood that the values in the graph and any values in the examples below assume the use of ideal filters operating under ideal settings, where there is virtually no light loss due to the filters themselves, a slight misalignment of the filters, or imperfections in the phototransistors or light detectors. In general, the output values from the light sensors 118, 128, 138 are expected to follow a similar wave-like relationship illustrated in FIG. 3 even when accounting for light loss or other factors that may impact the output values. Accordingly, the above-referenced technique is operable in real-world settings.

In the graph of FIG. 3, the x-axis denotes the polarization angle of the light emanating from the light source and the y-axis denotes the expected ratio between the light intensity measured by the filtered sensors 118, 128 as compared to the light intensity measured by the unfiltered sensor 138. As generally illustrated by the graph, when the polarization angle of the light source matches the angle of the polarization filter, there is no difference (other than internal losses of the filters) in the intensity of light that is detected by the particular filtered sensor as compared to the unfiltered sensor. As the polarization angle of the light source increases or decreases with respect to the polarizers of the light sensors 118, 128, the output values $S_1$ and $S_2$ for each of the light sensors 118, 128 also change with respect to the output value of the $S_3$. Accordingly, by comparing the output values $S_1$ and $S_2$ for each of the light sensors 118, 128 with the output value $S_3$ for the light sensor 138, the polarization system 100 can determine whether the detected light is polarized or non-polarized. In addition, the polarization system 100 (e.g., via the microcontroller 114) can further determine the polarization angle of the light, such as by using the correlation values illustrated in FIG. 3.

Table 1 below illustrates a further example of expected output values for determining whether detected light is polarized, and if so, in which direction the light is polarized. In Table 1, the polarization filters are offset by 45° relative to one another. For example, the first linear polarizer 120 of the first sensor 118 may be arranged at a 45° and the second linear polarizer 130 of the second sensor 128 may be arranged at a 90°. In this configuration, the following light intensity values are expected for polarized light having a polarization angle of 45° and 90°.

TABLE 1

Polarization Filters Offset by 45°

|  | Sensor with 45° filter | Sensor with 90° filter | Unfiltered sensor |
|---|---|---|---|
| Non-polarized light | 50% light intensity | 50% light intensity | 100% light intensity |
| Polarized light 45° | 100% light intensity | 50% light intensity | 100% light intensity |
| Polarized light 90° | 50% light intensity | 100% light intensity | 100% light intensity |

As illustrated by Table 1 above and the graph in FIG. 3, the polarized light from the light source can be expected to correspond to a specific value that is output by the filtered light sensors 118, 128 depending on the angle of the polarized light. For example, when the light receiving by the sensor is non-polarized, the light sensors 118, 128 would each detect approximately 50% light intensity as compared to the unfiltered sensor, which would detect 100% light intensity. When the polarized light from the light source is at a 45° angle, the first sensor 118 and the unfiltered sensor would both detect 100% light intensity, while the second sensor 128 with the polarizer arranged at a 90° angle would only detect 50% light intensity. Conversely, when the polarized light from the light source is at a 90° angle, the second sensor 128 and the unfiltered sensor would both detect 100% light intensity, while the first sensor 118 with the polarizer arranged at a 45° angle would only detect 50% light intensity. Accordingly, one can use the expected relationship of the light detected by the first and second sensors 118, 128 as compared to the unfiltered sensor 138 to determine whether the detected light is polarized (meaning that it is likely emanating from an electronic display 104) or non-polarized (meaning that it is likely ambient or natural light). It should be understood that the above values, and those in the graph in FIG. 3 are for ideal settings, where there is virtually no light loss due to a slight misalignment of the filters or imperfections in the phototransistors or light detectors. In general, the output values from the light sensors 118, 128, 138 are expected to follow a similar wave-like relationship illustrated in FIG. 3 even when accounting for light loss or other factors that may impact the output values. Accordingly, the above-referenced technique is operable in real-world settings.

Figure 4:
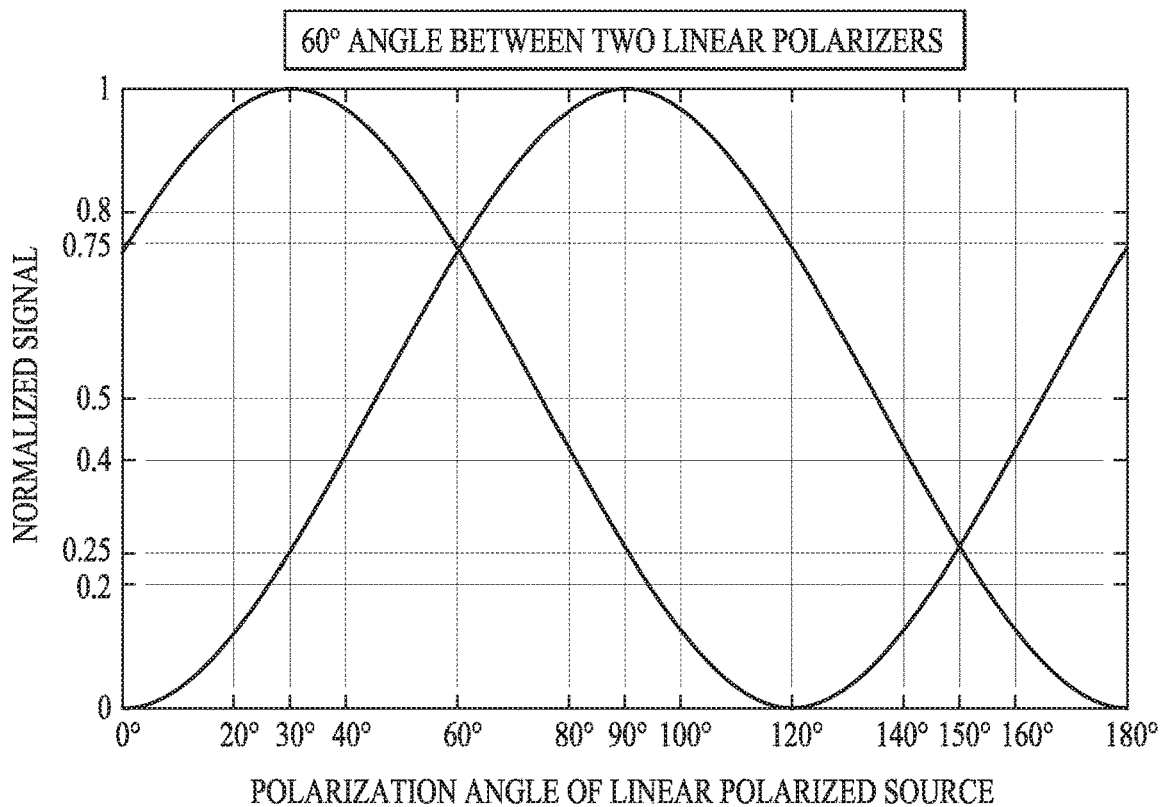

FIG. 4 illustrates another graph showing expected light intensity values for the filtered sensors 118, 128 as compared to the light intensity values measured by the unfiltered sensor 138. In FIG. 4, the polarization filters are offset by 60° relative to one another instead of 45° as in the example in FIG. 3. Accordingly, the first linear polarizer 120 of the first sensor 118 may be arranged at a 30° and the second linear polarizer 130 of the second sensor 128 may be arranged at a 90°. In this configuration, a similar relationship in measured light intensity values is seen as illustrated in FIG. 3. Table 2 below illustrates a further example of expected output values for determining whether detected light is polarized, and if so, in which direction the light it is polarized.

TABLE 2

Polarization Filters Offset by 60°

|  | Sensor with 30° filter | Sensor with 90° filter | Unfiltered sensor |
|---|---|---|---|
| Non-polarized light | 50% light intensity | 50% light intensity | 100% light intensity |
| Polarized light 30° | 100% light intensity | 25% light intensity | 100% light intensity |
| Polarized light 90° | 25% light intensity | 100% light intensity | 100% light intensity |

As illustrated by Table 2 above and the graph in FIG. 4, the polarized light from the light source is expected to correspond to a specific value that is output by the filtered light sensors 118, 128 depending on the angle of the polarized light. For example, with the polarizers 120, 130 having the properties described above, when the light is non-polarized, the light sensors 118, 128 would detect approximately 50% light intensity as compared to the unfiltered sensor, which would detect 100% light intensity. When the polarized light from the light source is detected at a 30° angle, the first sensor 118 and the unfiltered sensor would both detect 100% light intensity, while the second sensor 128 with the polarizer arranged at a 90° angle would only detect 25% light intensity. Conversely, when the polarized light from the light source is at a 90° angle, the second sensor 128 and the unfiltered sensor would both detect 100% light intensity, while the first sensor 118 with the polarizer arranged at a 30° angle would only detect 25% light intensity. Accordingly, in a similar fashion as described with reference to FIG. 3 and Table 1, the first and second sensors 118, 128 (each of which having polarizers arranged to allow polarized light at a particular angle to pass through) and the unfiltered sensor 138 may be used to detect light and determine whether the detected light is polarized or non-polarized.

Figure 5:
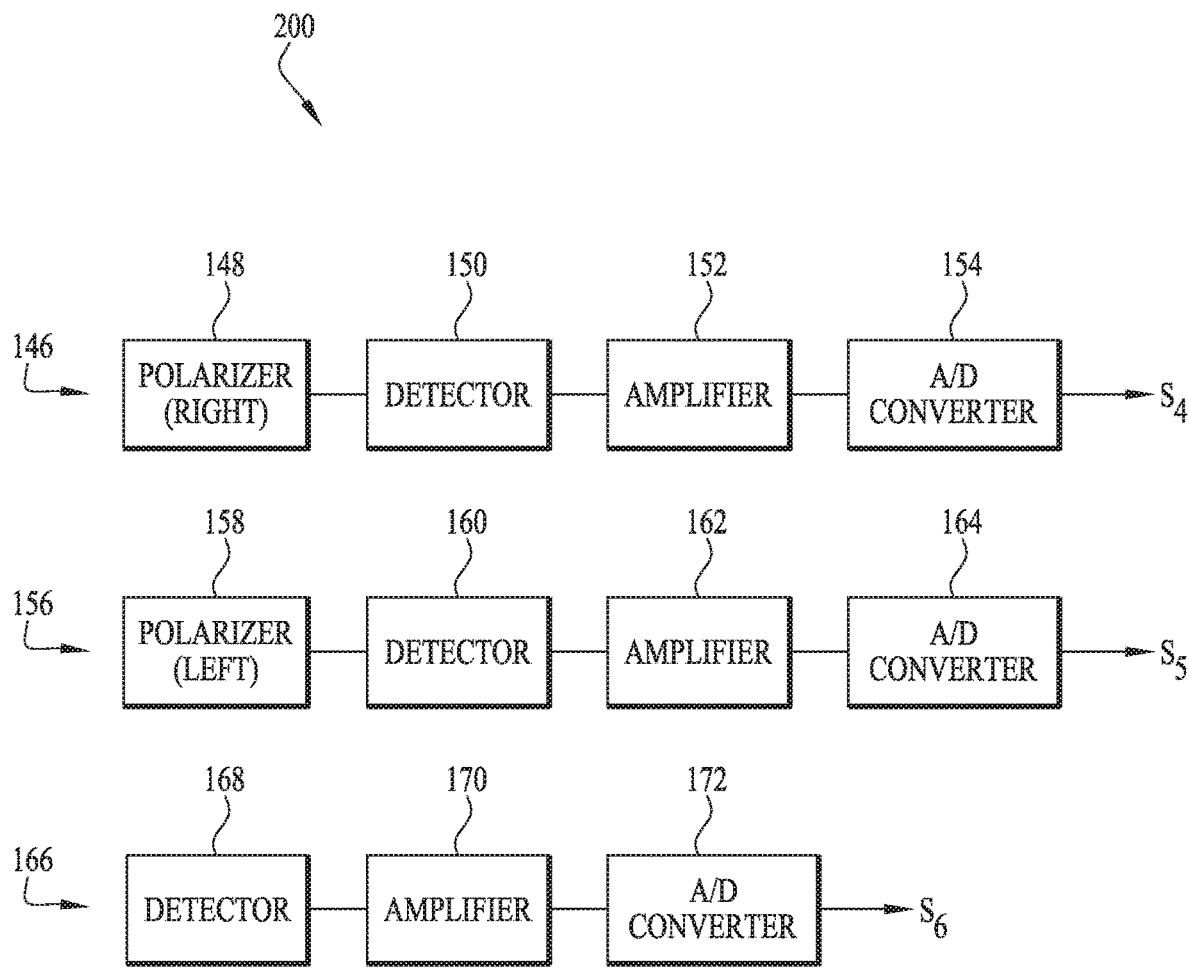
FIG. 5 is a schematic illustration of one embodiment of polarization light sensors in accordance with another embodiment.

In other embodiments, the polarized light sensor system 200 may include a similar arrangement as the polarized light sensor system 100, but with light sensors operable to detect circularly polarized light. With reference to FIG. 5, the polarized light sensor system 200 may include a first polarized light sensor 146 with a right circular polarizer 148 and a first light detector 150 (such as a phototransistor or photodiode) located behind the right circular polarizer 148. In addition, the polarized light sensor system 200 may include a second polarized light sensor 156 with a left circular polarizer 158 and a second light detector 160 (such as a phototransistor or photodiode) located behind the left circular polarizer 158.

The first light detector 150 may be operably connected to a transimpedance amplifier 152 that converts current to voltage, and the voltage output may be directed to an analog to digital (A/D) converter 154 operable for producing a first signal $S_4$. The second light sensor 156 may be arranged in a similar fashion. In other words, the second light detector 160 may be operably connected to a transimpedance amplifier 162 that converts current to voltage, and the voltage output may be directed to an analog to digital (A/D) converter 164 operable for producing a second signal $S_5$.

The polarized light sensor system 200 includes a third light sensor 166 that does not include a polarizer. Rather, the third light sensor 166 remains unfiltered. The third light sensor 166 includes a third light detector 168 operably connected to a transimpedance amplifier 170 that converts current to voltage, and the voltage output may be directed to an analog to digital (A/D) converter 172 operable for producing a third signal $S_6$. In a similar fashion as described previously, the polarized light sensor system 200 is able to determine whether the light detected by the light sensors 146, 156, 166 is circularly polarized light or non-polarized light. As illustrated by Table 3 below, the polarized light from the light source is expected to correspond to a specific value that is output by the filtered light sensors 146, 156 depending on the circular polarization of the absorbed light.

It should be understood that in some embodiments, the actual detected intensities may not be the same as the values presented in Table 3 due to light loss or ambient light that may be detected by all the sensors as described previously with respect to the embodiments described with reference to FIGS. 1-3.

In a preferred embodiment, the polarized light sensor system incorporates a combination of the polarized light sensor systems 100, 200. In such an embodiment, the polarized light sensor system may include four filtered light sensors 118, 128, 146, 156, where two light sensors 118, 128 include linear polarizers (e.g., polarizers 120, 130) and two light sensors 146, 156 include circular polarizers (e.g., polarizers 148, 158). The system may further include a single unfiltered sensor (e.g., 138 or 166). In this combination, the polarized light sensor system is able to absorb light and determine the polarization of the light, regardless of whether the light is linearly polarized light or circularly polarized light. Accordingly, the polarized light sensor system may be used to detect light from a variety of electronic displays, including mobile phones and organic light-emitting diode (OLED) displays. In a similar fashion as described previously with reference to the polarized light sensor system 100, 200, the output values of the filtered light

TABLE 3

Circular Polarization Filters

| | Left Circular Filtered Sensor | Right Circular Filtered Sensor | Unfiltered sensor |
|---|---|---|---|
| Non-polarized light | 50% light intensity | 50% light intensity | 100% light intensity |
| Linear polarized light | 50% light intensity | 50% light intensity | 100% light intensity |
| Left circular polarized source | 100% light intensity | 0% light intensity | 100% light intensity |
| Right circular polarized source | 0% light intensity | 100% light intensity | 100% light intensity |

As illustrated by Table 3, the polarized light from the light source is expected to correspond to a specific value that is output by the filtered light sensors 146, 156 depending on the circular polarization and/or linear polarization of the light. For example, when the light is non-polarized, the light sensors 146, 156 would detect approximately 50% light intensity as compared to the unfiltered sensor, which would detect 100% light intensity. When the light is linearly polarized, but not circular polarized, and detected by the light sensors 146, 156, both filtered sensors 146, 156 would detect 50% light intensity as compared to the unfiltered sensor 166, which would detect 100% light intensity. When the absorbed light is left circular polarized light, the right circular polarized light sensor 156 will detect 0% light intensity, while the remaining two sensors 146, 166 will detect 100% light intensity. Similarly, when the absorbed light is right circular polarized light, the left circular polarized light sensor 146, will detect 0% light intensity, while the remaining two sensors 156, 166 will detect 100% light intensity.

Accordingly, in a similar fashion as described previously, the expected correlation between the filtered light sensors 146, 156 as compared to the unfiltered light sensor 166 may be used to determine the polarization of the light being absorbed by the polarized light sensor system 200, and thereby determine whether the light is being emitted from an electronic display 104 or from another non-polarized source.

sensors 118, 128, 146, 156 may be compared to the light intensity of the unfiltered light sensor (and/or to each other) to determine the polarization of the absorbed light and whether it may be emitted by an electronic device 106 or another source.

As noted previously, when the light is determined to be from an electronic device 106, the mobile device 102 may be initialized with a corresponding program or application so that the mobile device 102 may interact with the electronic device 106, such as to capture data from the display 104 of the electronic device 106 by activating and/or adjusting an illumination system to avoid specular reflection of light and facilitate the data reading process, or to otherwise facilitate communication with the electronic device 106.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A polarized light sensor system comprising:
a first sensor including a first polarizer and a first light detector positioned behind the first polarizer, the first light detector operable to detect light passing through the first polarizer and generate a first current in response to detecting a presence of light;
a second sensor including a second polarizer and a second light detector positioned behind the second polarizer, the second light detector operable to detect light passing through the second polarizer and generate a second current in response to detecting a presence of light, wherein the first and second polarizers are linear polarizers and offset at an angle relative to one another;
an unfiltered sensor including a third light detector operable to detect light and generate a third current in response to detecting a presence of light;
a fourth sensor including a fourth polarizer and a fourth light detector positioned behind the fourth polarizer, the fourth light detector operable to detect light passing through the fourth polarizer and generate a fourth current in response to detecting a presence of light;
a fifth sensor including a fifth polarizer and a fifth light detector positioned behind the fifth polarizer, the fifth light detector operable to detect light passing through the fifth polarizer and generate a fifth current in response to detecting a presence of light, wherein the fourth and fifth polarizers are circular polarizers; and
at least one converter operable to receive the first, second, third, fourth, and fifth currents and convert the first, second, third, fourth, and fifth currents to a first, second, third, fourth and fifth voltage signal value, respectively;
a processor in operable communication with each of the first, second, unfiltered, fourth, and fifth sensors, the processor operable to analyze the first, second, third, fourth, and fifth voltage signal values and determine whether the detected light is polarized or non-polarized.

2. The polarized light sensor system of claim 1, wherein the processor is also operable to analyze the first, second, and third voltage signal values and determine a polarization angle of the detected light.

3. The polarized light sensor system of claim 1, wherein the first and second polarizers are offset at an angle of 60 degrees relative to one another.

4. The polarized light sensor system of claim 1, further comprising a first amplifier in communication with the first light detector, and a second amplifier in communication with the second light detector.

5. An optical data reader for reading decodable indicia from an electronic device, the optical data reader comprising:
a first sensor including a first polarizer and a first light detector positioned behind the first polarizer, the first light detector operable to detect light emitted by the electronic device and passing through the first polarizer and to generate a first current in response to detecting the light emitted by the electronic device;
a second sensor including a second polarizer and a second light detector positioned behind the second polarizer, the second light detector operable to detect light emitted by the electronic device and passing through the second polarizer and to generate a second current in response to detecting the light emitted by the electronic device, wherein the first and second polarizers are offset at an angle of at least 60 degrees relative to one another;
an unfiltered sensor including a third light detector operable to detect light emitted by the electronic device and to generate a third current in response to detecting the light emitted by the electronic device;
at least one converter operable to receive the first, second, and third currents and convert the first, second, and third currents to a first, second, and third voltage signal value, respectively; and
a processor in operable communication with each of the first, second, and unfiltered sensors, the processor operable to analyze the first, second, and third voltage output values and determine whether the detected light emitted by the electronic device is polarized or non-polarized.

6. The optical data reader of claim 5, further comprising an illumination system wherein an activation mode of the illumination system is configured in response to the processor determining that the detected light emitted by the electronic device is polarized.

7. The optical data reader of claim 5, wherein in response to the processor determining that the detected light is polarized, the optical image reader initiates a pairing operation to establish a wireless connection with the electronic device.

8. The optical data reader of claim 5, wherein the first and second polarizers are linear polarizers.

9. The sensor system of claim 5, wherein the first and second polarizers are circular polarizers.

10. The sensor system of claim 5, further comprising a first amplifier in communication with the first light detector, and a second amplifier in communication with the second light detector.

11. The sensor system of claim 5, further comprising:
a fourth sensor including a fourth polarizer and a fourth light detector positioned behind the fourth polarizer, the fourth light detector operable to detect light passing through the fourth polarizer and generate a fourth current in response to detecting the light emitted by the electronic device;
a fifth sensor including a fifth polarizer and a fifth light detector positioned behind the fifth polarizer, the fifth light detector operable to detect light passing through the fifth polarizer and generate a fifth current in response to detecting the light emitted by the electronic device; and
wherein the at least one converter is further operable to receive the fourth and fifth currents and convert the fourth and fifth currents to a fourth and fifth voltage signal value, respectively, and wherein the processor is further in operable communication with each of the fourth and fifth sensors, the processor operable to analyze the fourth and fifth voltage signal values and determine whether the detected light is polarized or non-polarized.

12. The sensor system of claim 11, wherein the fourth polarizer is a right circular polarizer and the fifth polarizer is a left circular polarizer.

13. The optical data reader of claim 5, wherein the at least one converter includes separate converters for receiving each of the first, second, and third currents individually.

14. The optical data reader of claim 5, wherein the at least one converter includes a single common converter for receiving each of the first, second and third currents.

15. The optical data reader of claim 5, further comprising an indicator operably coupled with the processor and configured to indicate whether polarized light has been sensed.

16. A polarized light sensor system comprising:
- a first sensor including a first polarizer and a first light detector positioned behind the first polarizer, the first light detector operable to detect light passing through the first polarizer and generate a first current in response to detecting a presence of light;
- a second sensor including a second polarizer and a second light detector positioned behind the second polarizer, the second light detector operable to detect light passing through the second polarizer and generate a second current in response to detecting a presence of light, wherein the first and second polarizers are circular polarizers and offset at an angle relative to one another;
- an unfiltered sensor including a third light detector operable to detect light and generate a third current in response to detecting a presence of light; and
- a processor configured to compare the third current with the first and the second currents and to determine whether the detected light is polarized or non-polarized.

17. The polarized light sensor system of claim 16, wherein the first polarizer is a right circular polarizer and the second polarizer is a left circular polarizer.

18. The polarized light sensor system of claim 16, wherein the evaluation circuit is further configured to determine a polarization angle the detected light.

19. The polarized light sensor system of claim 16, wherein the processor includes at least one of a microcontroller or an evaluation circuit.

* * * * *